Sept. 15, 1925.
J. A. JOHNSON ET AL
1,553,694
SAFETY MONEY RECEPTACLE
Filed April 21, 1924
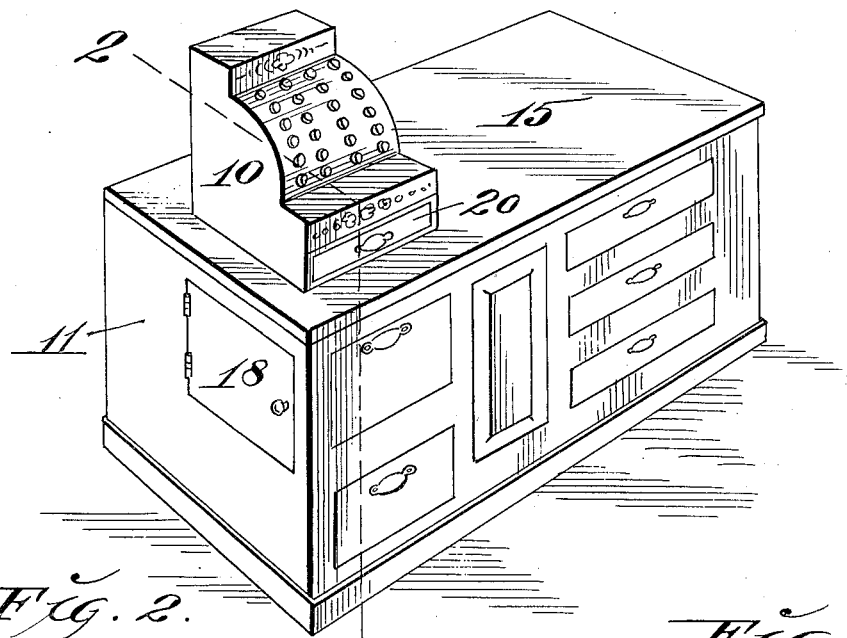
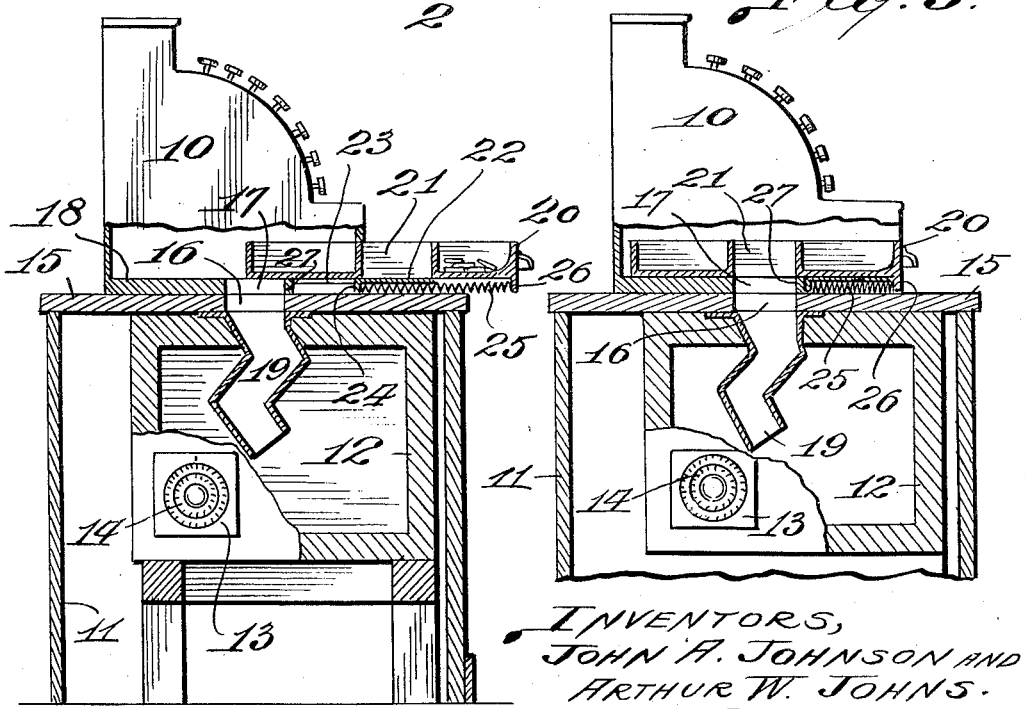

Patented Sept. 15, 1925.

1,553,694

UNITED STATES PATENT OFFICE.

JOHN A. JOHNSON AND ARTHUR W. JOHNS, OF LOS ANGELES, CALIFORNIA.

SAFETY MONEY RECEPTACLE.

Application filed April 21, 1924. Serial No. 707,892.

*To all whom it may concern:*

Be it known that we, JOHN A. JOHNSON and ARTHUR W. JOHNS, citizens of the United States, residing at Los Angeles, in the county of Los Angeles and State of California, have invented certain new and useful Improvements in Safety Money Receptacles, of which the following is a specification.

Our invention relates to a safety money receptacle, the principal object of our invention being to provide simple and efficient means that may be associated with a cash register, cash drawer, money till or the like and which when used will be effective in transferring money, valuable papers and the like that are placed in one of the compartments of the cash drawer or till into a safe or strong box that is concealed within the table or desk that serves as a support for the cash register or money drawer.

A further object of our invention is to provide a money drawer or till with a compartment having a movable bottom which latter, when the drawer or till is open, is in proper position to form the bottom for the compartment with which it is associated, said bottom being arranged so as to automatically open when the drawer is closed or moved into its compartment within the cash register or counter. As a result of this construction, clerks, salesmen and other authorized persons may place bills and larger coins in the compartment having the movable bottom, and when the drawer is closed said bills and coins will pass into the concealed strong box or safe, and if the money drawer is opened by a thief or burglar, the compartment having the false bottom will appear empty. As a result of this automatic transfer of money and valuables to a concealed safe or strong box, the theft or robbery of any considerable amount of money from the equipped cash register or money drawer is foiled.

With the foregoing and other objects in view, our invention consists in the features of construction and combination and arrangement of parts hereinafter more fully described and claimed, reference being had to the accompanying drawings, in which—

Figure 1 is a perspective view of a cash register positioned on a desk or table, which cash register and desk or table are equipped with our improved safety money receptacle;

Figure 2 is a vertical section taken approximately on the line 2—2 of Figure 1 and showing the money drawer in the lower portion of the cash register open;

Figure 3 is a sectional view similar to Figure 2 and showing the money drawer in the lower portion of the cash register in closed position.

Referring by numerals to the accompanying drawings, which illustrate a practical embodiment of our invention, 10 designates a cash register of the type now generally used in stores or wherever goods are retailed for cash; and where said cash register is equipped with our improved money drawer we prefer to locate said cash register on a desk, table or other box-like support 11. In any event, the supporting structure should be provided with side and end walls in order to conceal a small metal safe or strong box 12 which may be suitably supported within the desk or table and which may be provided with a door 13, the latter being equipped with a combination lock 14.

Formed in the desk or table top 15 at a point directly over the safe or strong box 12 is an opening 16, the same communicating with an opening 17 that is formed in the bottom 18 of the cash register, and leading downwardly from opening 16 through the top of the safe or strong box 12 is a metal chute 19 that is preferably provided with two or more angular elbows. Arranged for sliding movement in the usual manner in the lower portion of the cash register 10 is a money drawer 20 which may be provided with a number of compartments that are adapted to receive coins and paper money of different denominations, and in accordance with our invention one of these compartments, such as 21, is equipped with a sliding bottom 22 in the form of a plate or panel that is arranged to slide horizontally in a suitable guideways 23 that are formed on the under side of drawer 20 to the side of compartment 21. The rear edge of this plate or panel 22 is provided with a depending lip 24 and bearing thereupon is one end of an expansive coil spring 25, the forward or outer end thereof bearing against a shoulder 26 that is formed on the rear or inner side of the front wall or plate of drawer 20.

Formed on the bottom 18 of the cash register at the rear ends of the guideways 23 is a stop lug 27 against which the depending ear or lip 24 is adapted to engage when the cash drawer and the sliding bottom are moved into the base of the register. (See Figure 3).

Thus, when the cash drawer is closed, the depending ear or lip 24 engages against the stop lug 27 so that the sliding bottom 22 occupies a position beneath the front portion of the drawer 20, consequently leaving the entire bottom of compartment 21 open and in direct communication with the openings 17 and 16. Consequently, any coins or bills that the salesmen may place in compartment 21 when the cash drawer is open will, as said drawer is closed and bottom 22 moves away from said compartment 21, drop through the openings 17 and 16 and through the chute 19 into the safe or strong box 12. Whenever the cash drawer 20 is opened, spring 25 will act to move bottom plate or panel 22 into position to form a bottom for compartment 21, so that if a thief or unauthorized person opens the money drawer for the purpose of robbery, compartment 21 is entirely empty and only coins of smaller denominations that have been placed in the other compartments in the cash drawer will be exposed to view. In order to gain access to the safe or strong box 12, a door such as 26 may be formed in one of the side or end walls of the desk or table 12.

Thus it will be seen that we have provided relatively simple and efficient means whereby money placed in a money drawer or till will be automatically discharged into a safe or strong box as said money drawer or till is closed, which provision will greatly minimize money losses as a result of the cash register or till being opened by thieves.

It will be understood that minor changes in the size, form and construction of our safety money receptacle may be made without departing from the spirit of our invention, the scope of which is set forth in the appended claims.

We claim as our invention:

1. The combination, with a concealed safe having an opening in its top, of a money drawer arranged for sliding movement above said safe, which money drawer is provided with a compartment that is adapted to register with the opening in the top of said safe, and a spring-pressed panel arranged for sliding movement on the under side of said money drawer and adapted to close the bottom of the compartment therein when said drawer is opened.

2. The combination, with a concealed safe having an opening in its top, of a money drawer arranged for sliding movement above said safe, which money drawer is provided with a compartment that is adapted to register with the opening in the top of said safe, a spring-pressed panel arranged for sliding movement on the under side of said money drawer and adapted to close the bottom of the compartment therein when said drawer is opened, and means whereby said sliding panel is moved away from said compartment to open the bottom thereof when the money drawer is closed.

3. The combination, with a concealed safe having an opening in its top, of a money drawer arranged for sliding movement above said safe and having a compartment that is adapted to register with the opening in the top of the safe when said money drawer is closed, and a spring-pressed panel arranged to form a bottom for said compartment when the money drawer is opened and to move away from said compartment to open the bottom thereof when said drawer is moved into position so that the compartment registers with the opening in the top of the safe.

In testimony whereof we affix our signatures.

JOHN A. JOHNSON.
ARTHUR W. JOHNS.